(12) United States Patent
Blankenship

(10) Patent No.: US 6,444,954 B1
(45) Date of Patent: *Sep. 3, 2002

(54) TOASTER OVENS

(75) Inventor: Paul M. Blankenship, Glen Allen, VA (US)

(73) Assignee: Hamilton Beach/Proctor-Silex, Inc., Glen Allen, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,705

(22) Filed: Nov. 10, 1999

(51) Int. Cl.[7] ............................. A47J 37/06; A21B 1/14; A21B 1/52; A21B 3/00
(52) U.S. Cl. .................. 219/391; 219/386; 219/411
(58) Field of Search .................................. 219/391, 386, 219/405, 411; 99/389, 401, 400, 449; 126/275 E, 275 A, 275 R, 19 M; 248/201, 675; 312/316

(56) References Cited

U.S. PATENT DOCUMENTS

| | | | |
|---|---|---|---|
| 2,944,540 A | | 7/1960 | Littell, Jr. |
| 3,585,360 A | * | 6/1971 | Young et al. ............... 219/405 |
| 3,626,155 A | | 12/1971 | Joeckel |
| 3,660,637 A | | 5/1972 | Grove |
| 3,684,860 A | | 8/1972 | Snyder |
| 3,693,538 A | * | 9/1972 | Synder ....................... 219/405 |
| 3,752,955 A | | 8/1973 | Grove |
| 3,859,903 A | * | 1/1975 | Kipp ........................... 99/391 |
| D237,242 S | | 10/1975 | Claxton |
| D241,602 S | | 9/1976 | Hanson et al. |
| 4,065,659 A | | 12/1977 | Yount et al. |
| 4,185,546 A | | 1/1980 | Karpisek |
| 4,254,325 A | | 3/1981 | Snyder |
| 4,296,312 A | | 10/1981 | Salem |
| 4,307,285 A | | 12/1981 | DeRemer |
| 4,413,173 A | | 11/1983 | Grove et al. |
| 4,415,799 A | | 11/1983 | Tanaka et al. |
| 4,455,479 A | | 6/1984 | Itoh et al. |
| 4,456,820 A | | 6/1984 | Krasznai et al. |
| 4,517,452 A | | 5/1985 | Krasznai et al. |
| 4,538,049 A | | 8/1985 | Ryckman, Jr. |
| 4,580,853 A | * | 4/1986 | Hitzeroth et al. ........... 312/245 |
| 4,628,185 A | | 12/1986 | Norwood et al. |
| 4,645,909 A | * | 2/1987 | Thoben et al. .............. 219/411 |
| 4,656,337 A | * | 4/1987 | Lastofka et al. ............ 219/386 |
| 4,666,113 A | | 5/1987 | Itoh et al. |
| D292,058 S | | 9/1987 | Cesaroni |
| 4,720,622 A | | 1/1988 | Iwata et al. |
| 4,734,562 A | | 3/1988 | Amano et al. |
| 4,746,785 A | | 5/1988 | De Longhi |
| 4,796,850 A | | 1/1989 | Aramaki |
| 4,894,518 A | | 1/1990 | Ishikawa et al. |
| D336,814 S | | 6/1993 | Brookshire |

(List continued on next page.)

Primary Examiner—Joseph Pelham
(74) Attorney, Agent, or Firm—Roger S. Dybvig

(57) ABSTRACT

A toaster oven has a sheet metal chassis and plastic, cool-wall support walls which support the chassis. Both a pivotally-mounted bottom panel and a slidable crumb tray may be provided. Parts of the chassis are connected together without the use of fasteners or welds by twist tabs. A sheet metal top panel and, optionally, a plastic top panel extend over the top of the chassis. One of the support walls has a pair of locking pins and the plastic top wall has a forwardly-facing hook engaged with one of said locking pins and a rearwardly-facing hook engaged with the other of said locking pins. Support pads on the inner faces of the plastic support walls may cooperate with mounting members for supporting the toaster oven on the bottom of a kitchen cabinet. A control compartment beside the oven chamber houses electrical controls including a heat sensing thermistor mounted in a porcelain tube held against the wall that separates the control compartment from the oven chamber.

15 Claims, 20 Drawing Sheets

U.S. PATENT DOCUMENTS

| | | |
|---|---|---|
| 5,471,914 A | * 12/1995 | Krasznai et al. .............. 99/389 |
| D380,643 S | 7/1997 | Piret |
| D381,861 S | 8/1997 | Rorke et al. |
| D386,938 S | 12/1997 | Piret |
| 5,694,881 A | 12/1997 | Haroun et al. |
| D403,201 S | 12/1998 | Cruz et al. |
| D406,721 S | 3/1999 | Schubert-Belle et al. |
| D412,637 S | 8/1999 | Piret |
| D415,926 S | 11/1999 | De' Longhi |
| D420,245 S | 2/2000 | De' Longhi |
| D425,749 S | 5/2000 | Homayoun et al. |
| 6,140,621 A | 10/2000 | Ho et al. |

* cited by examiner

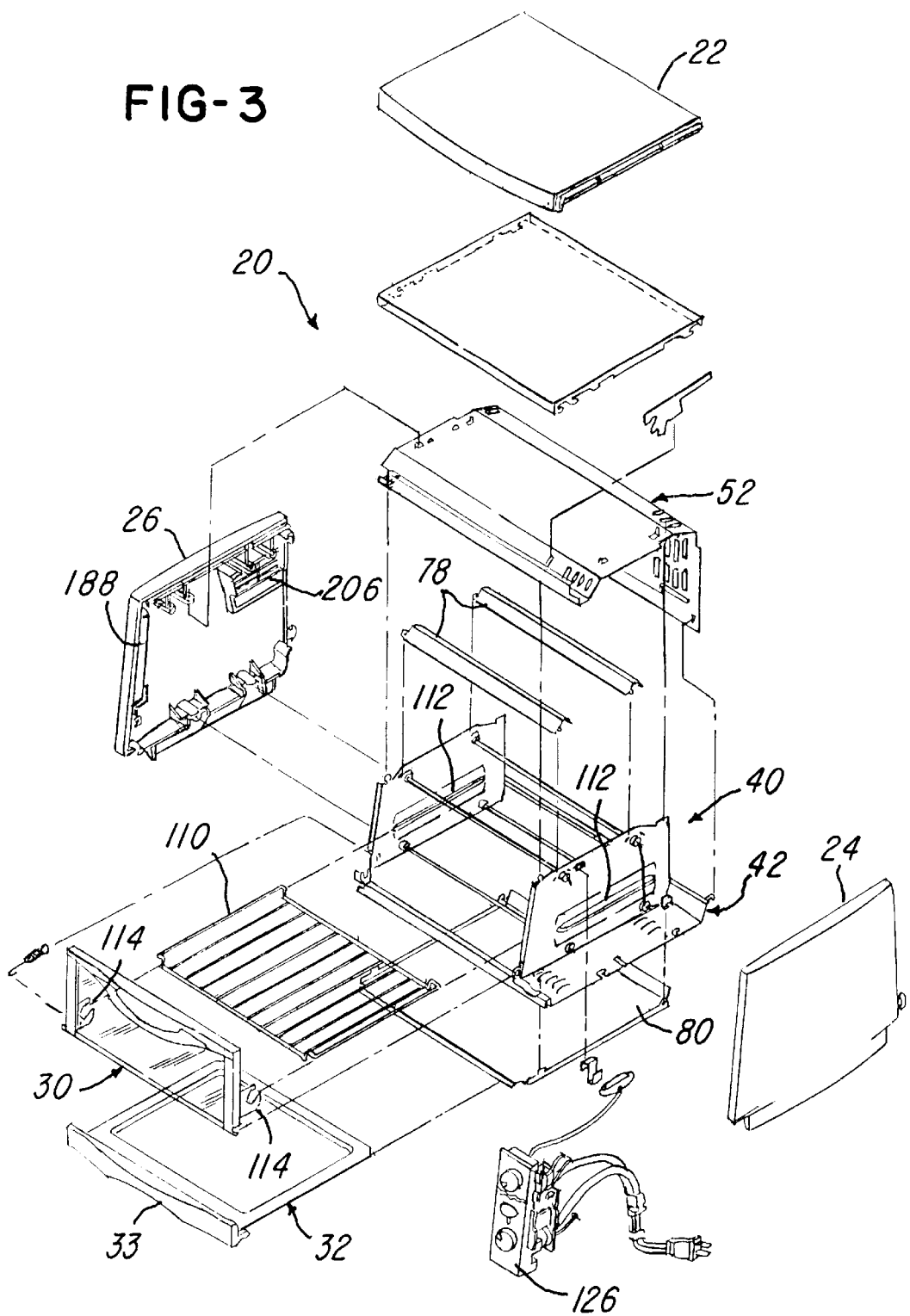

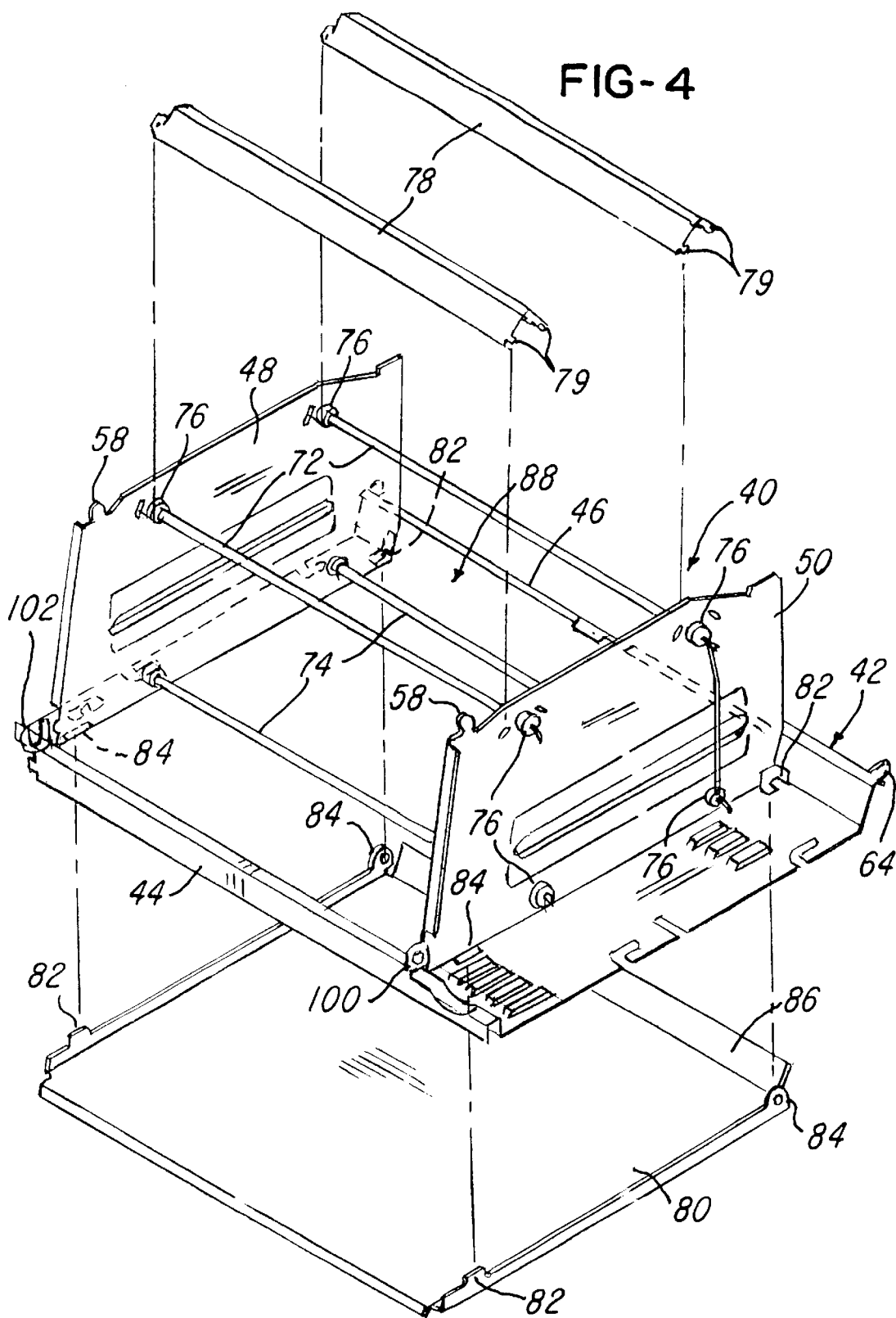

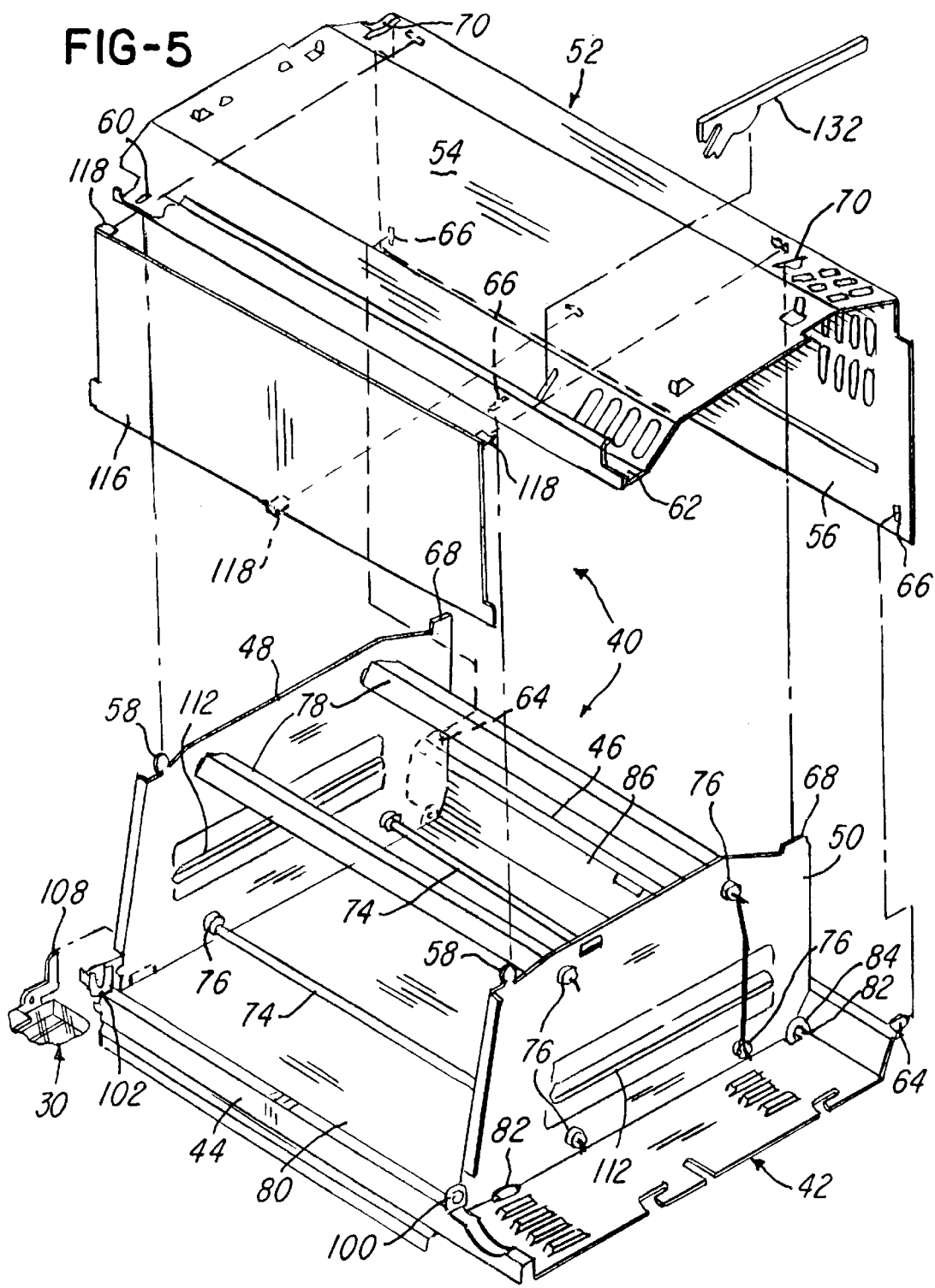

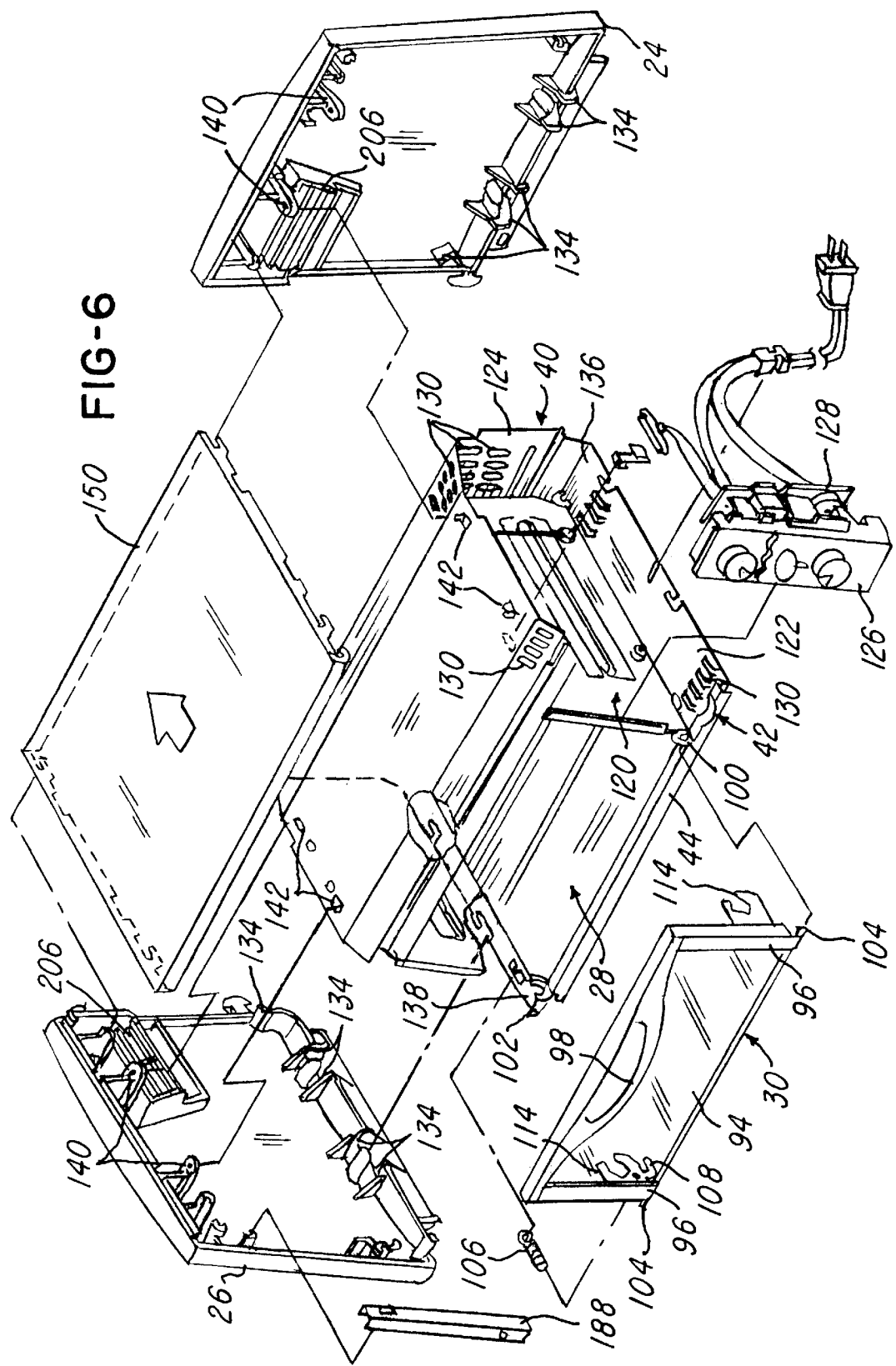

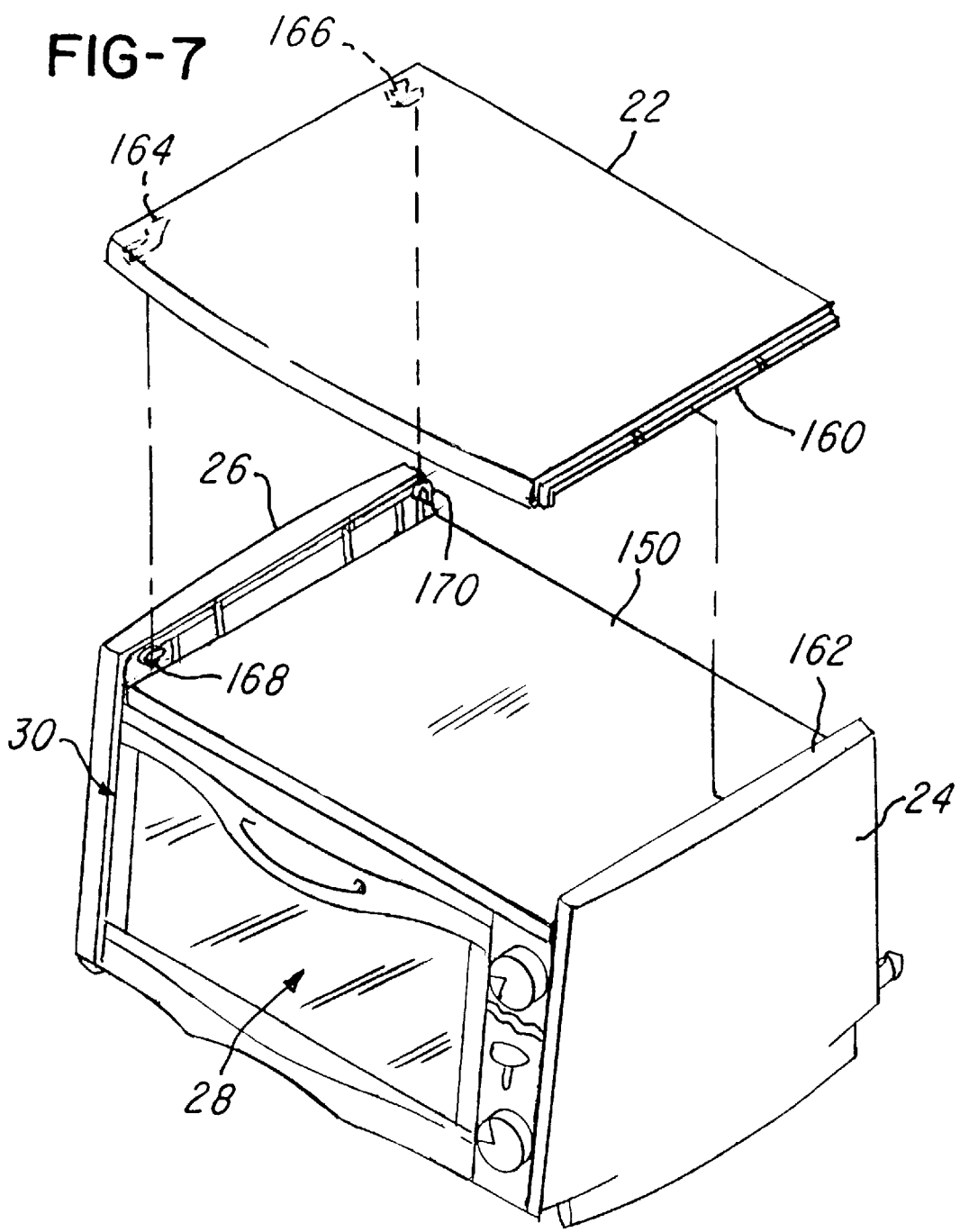

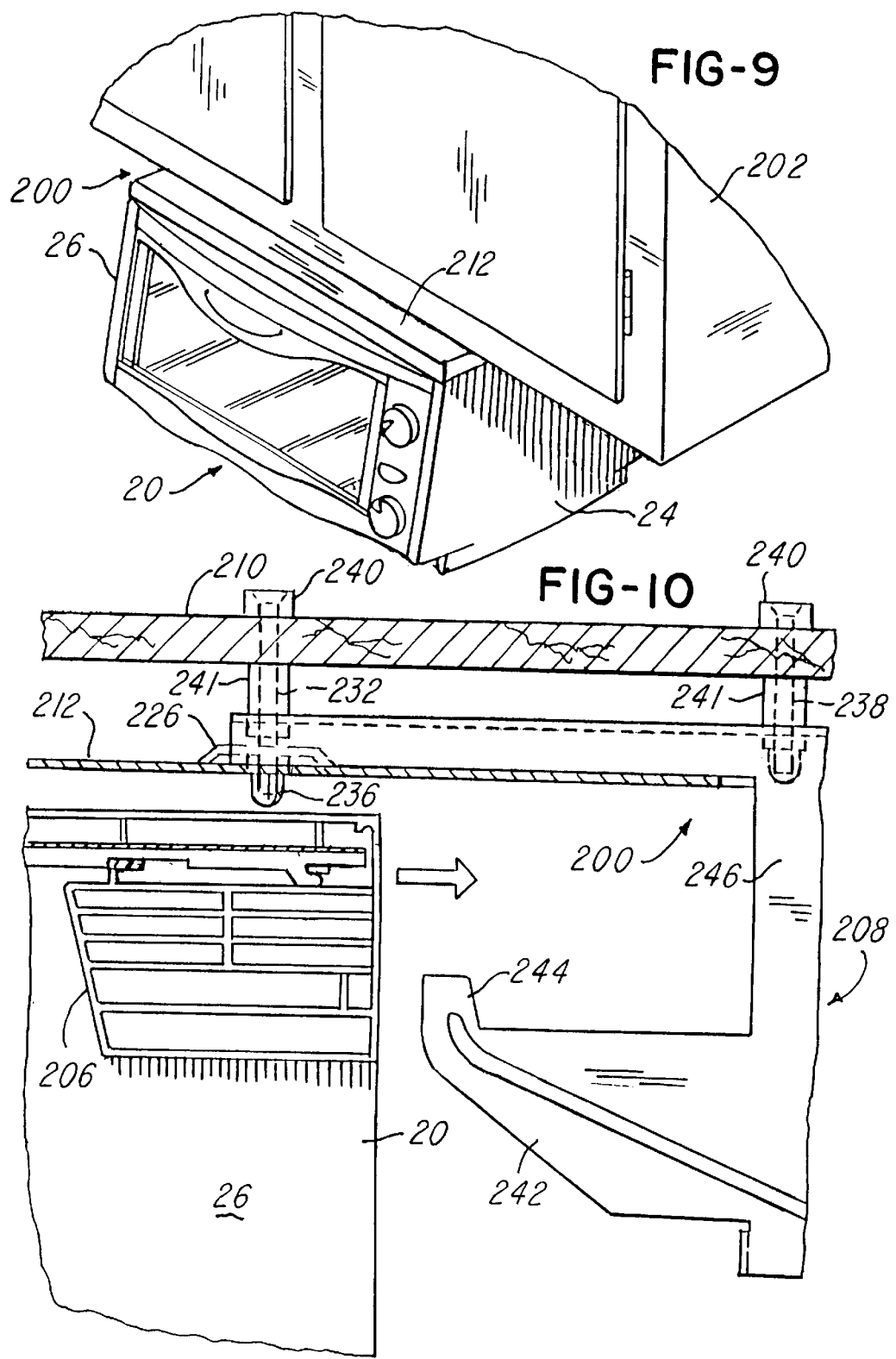

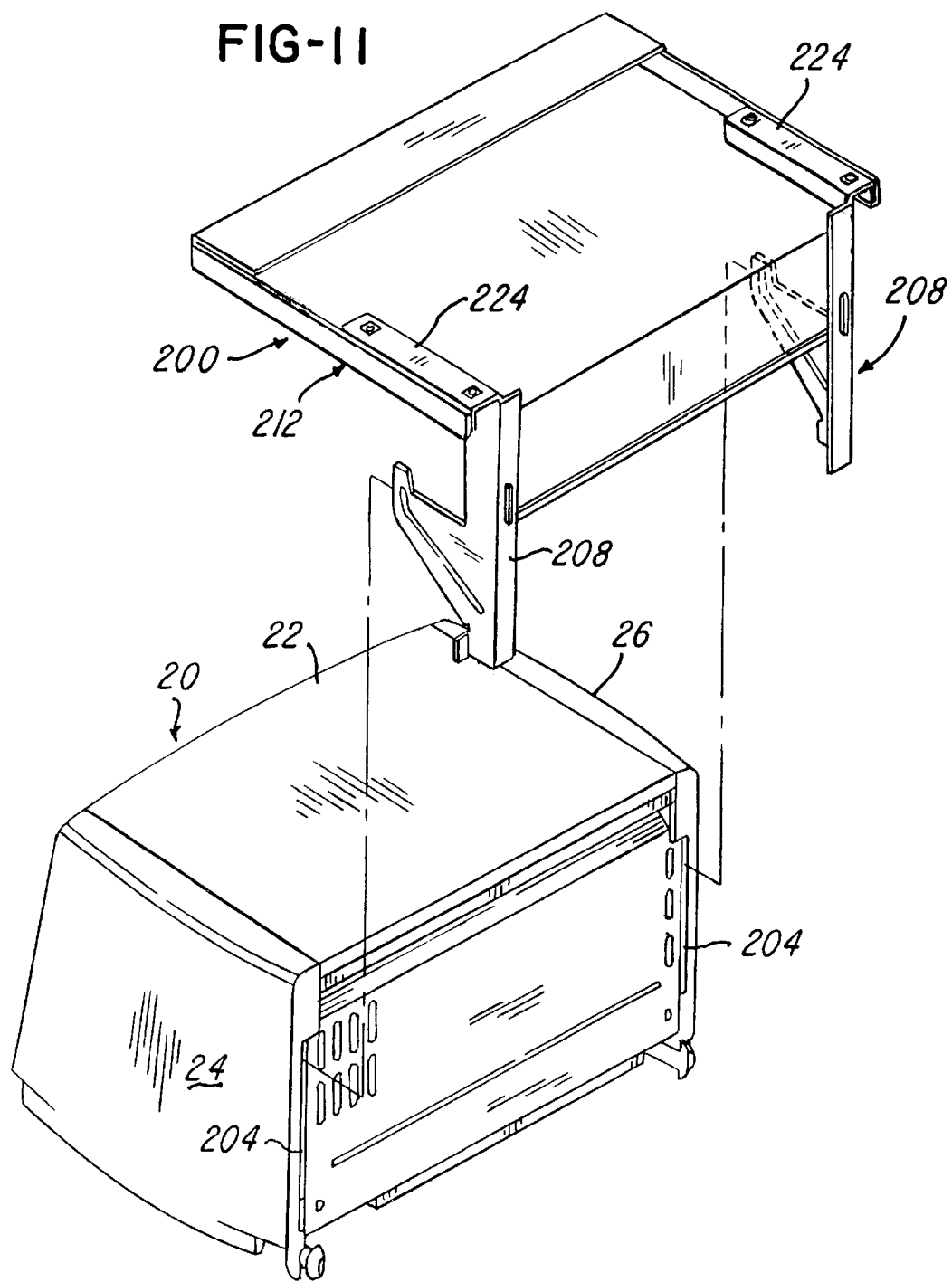

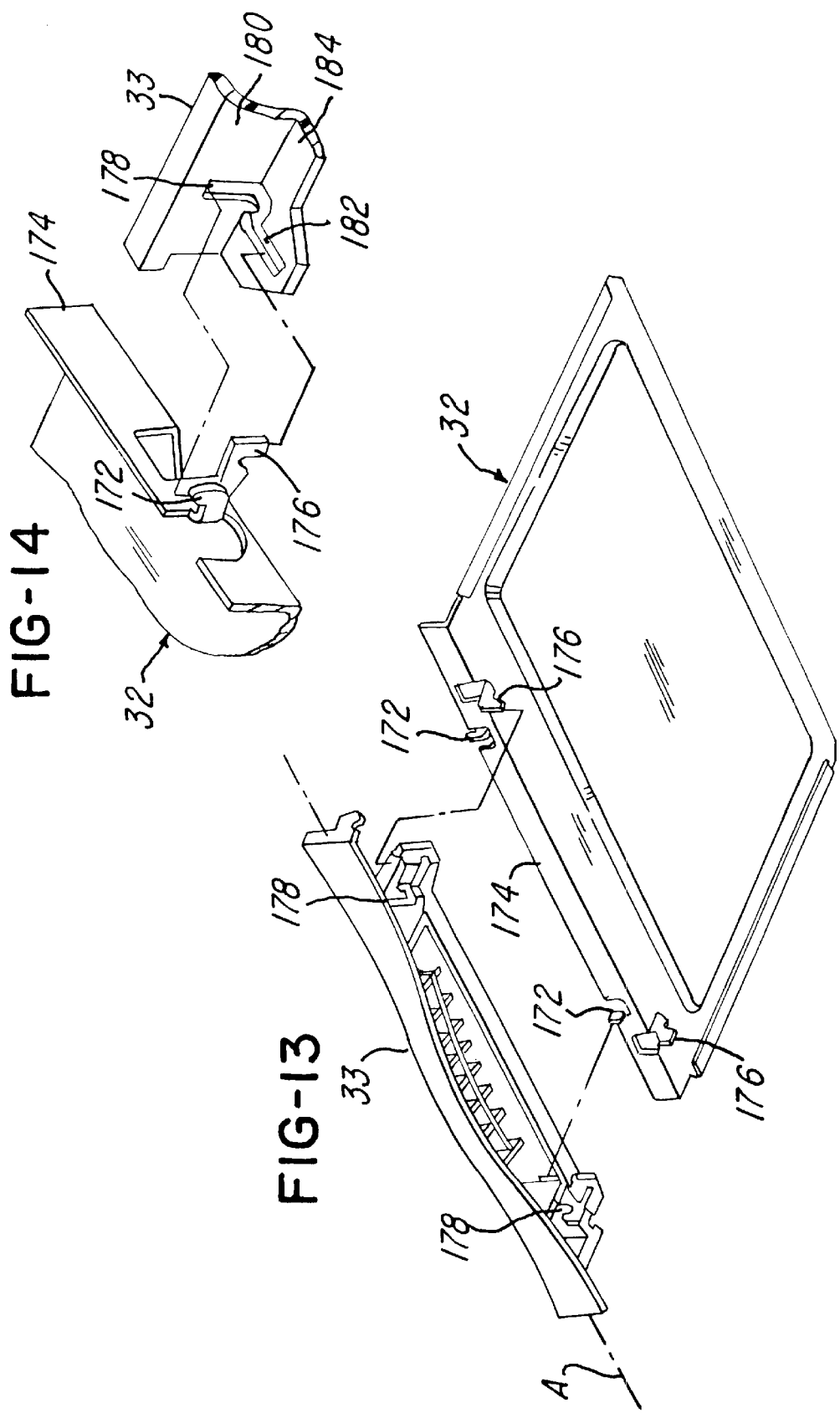

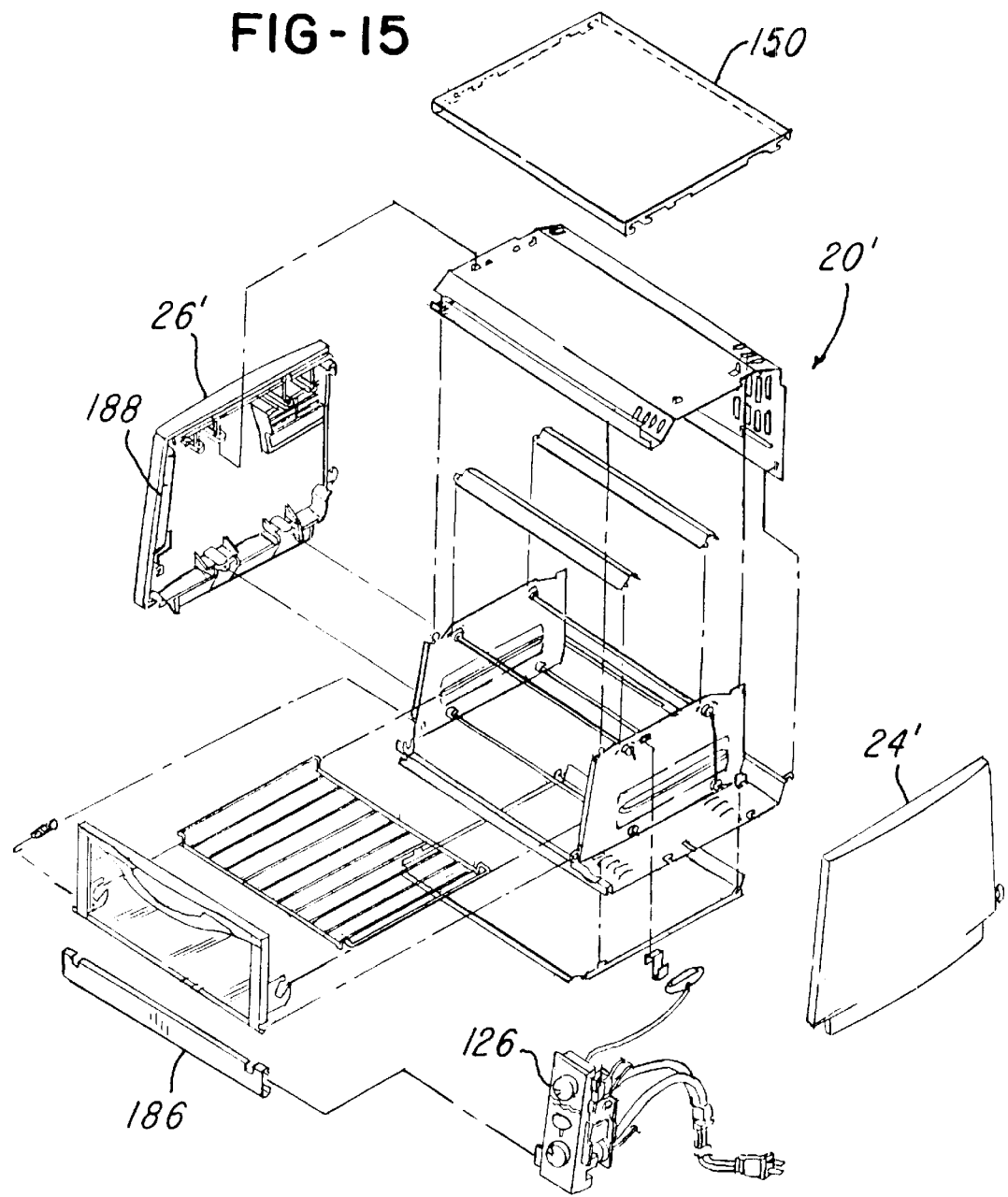

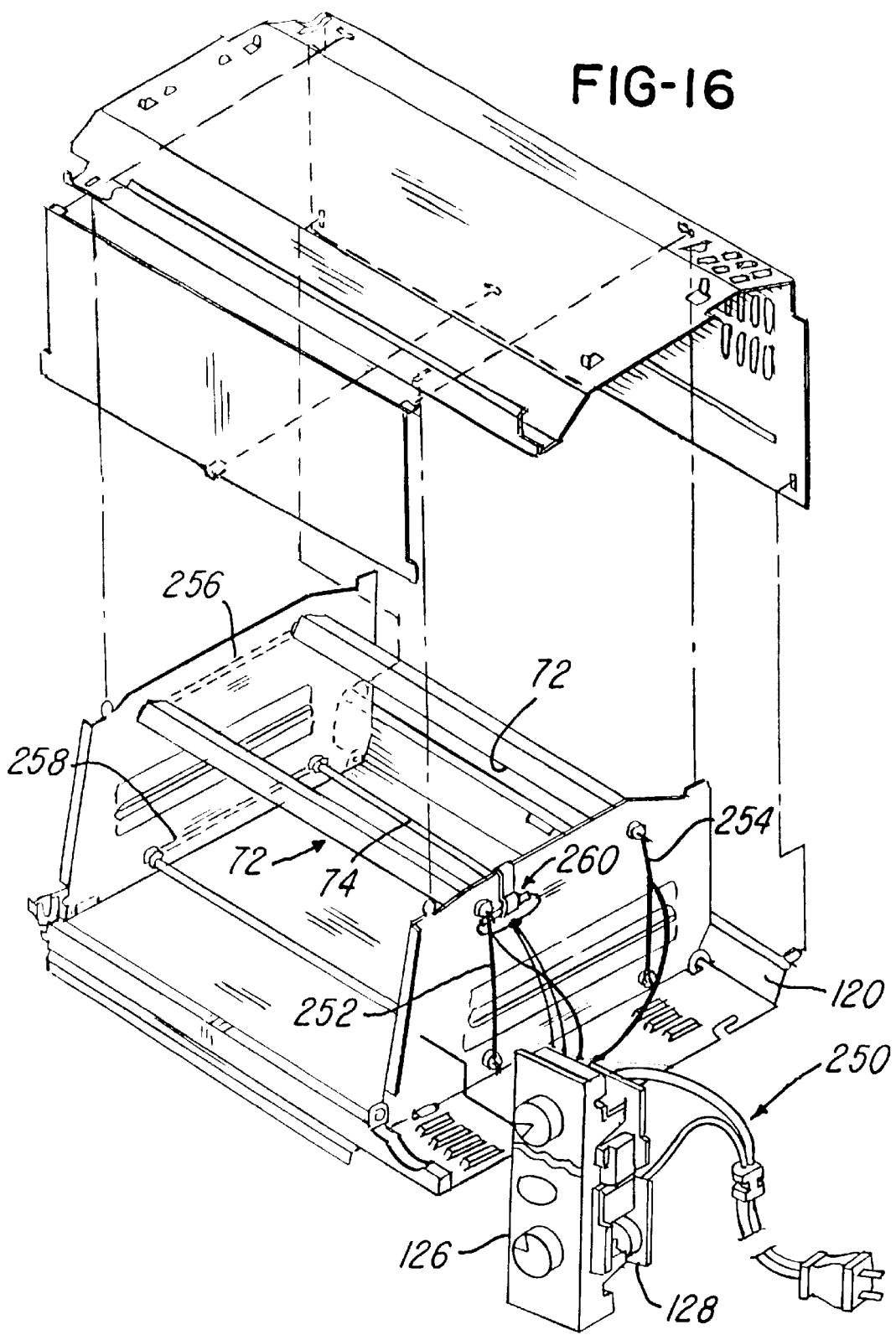

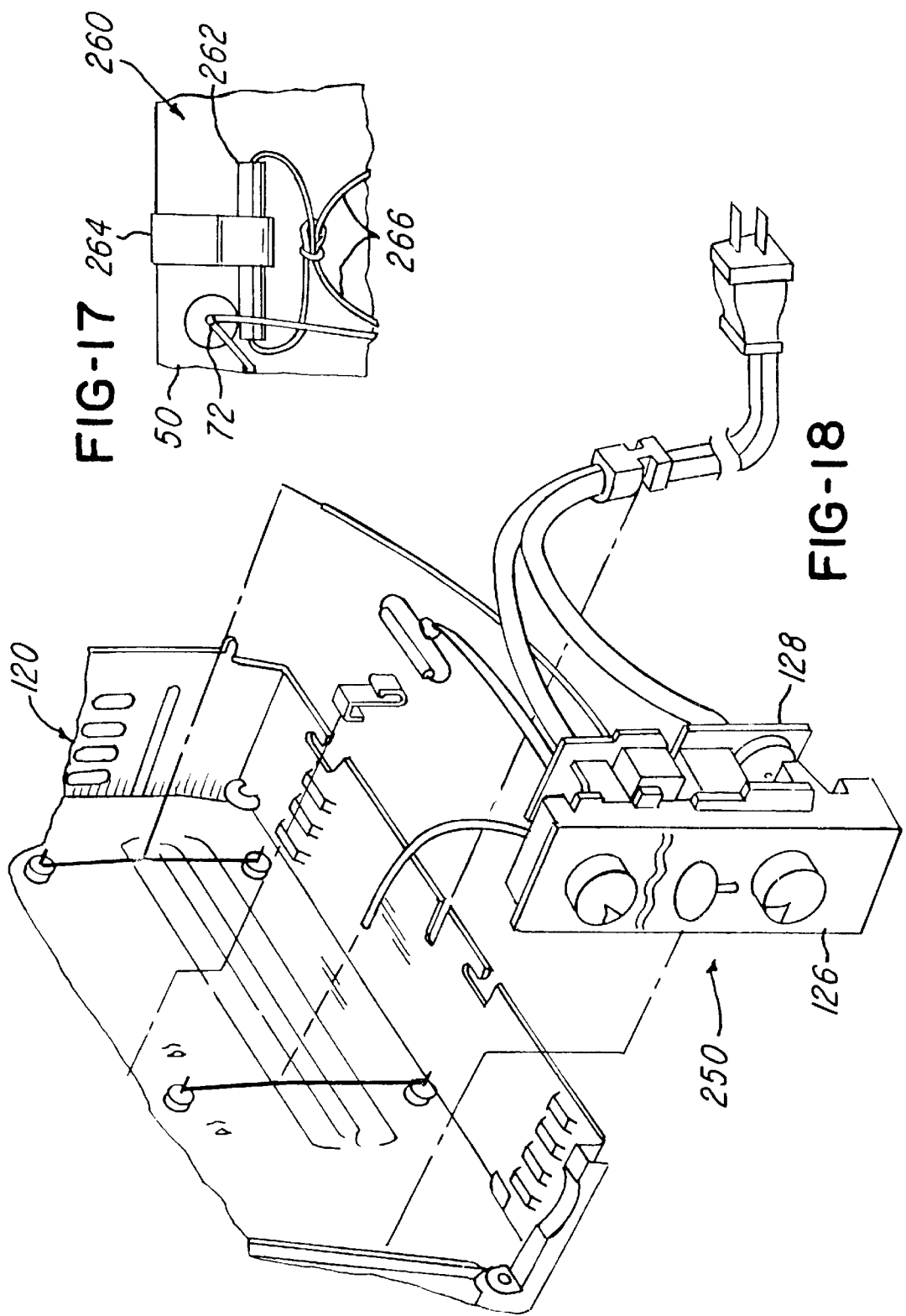

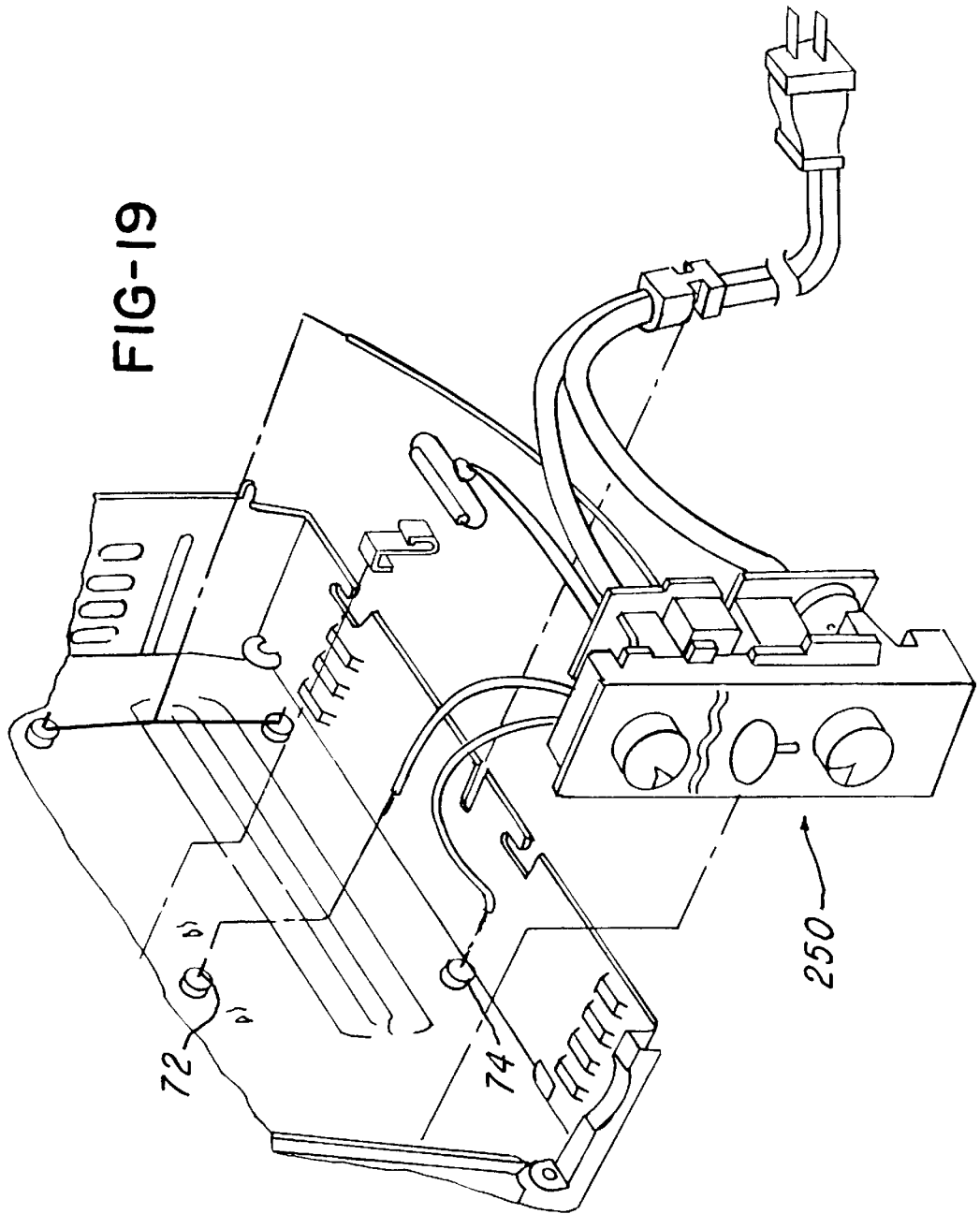

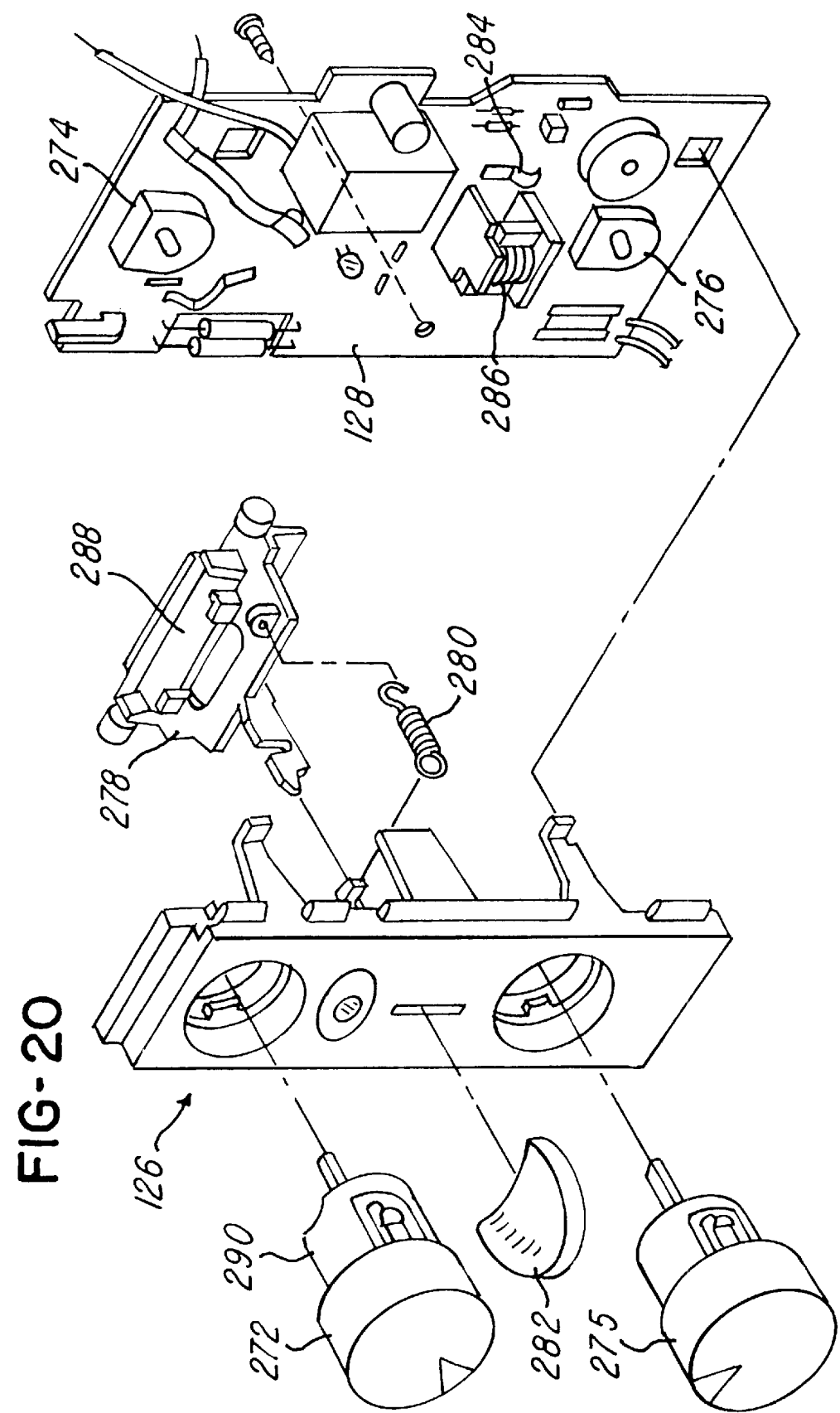

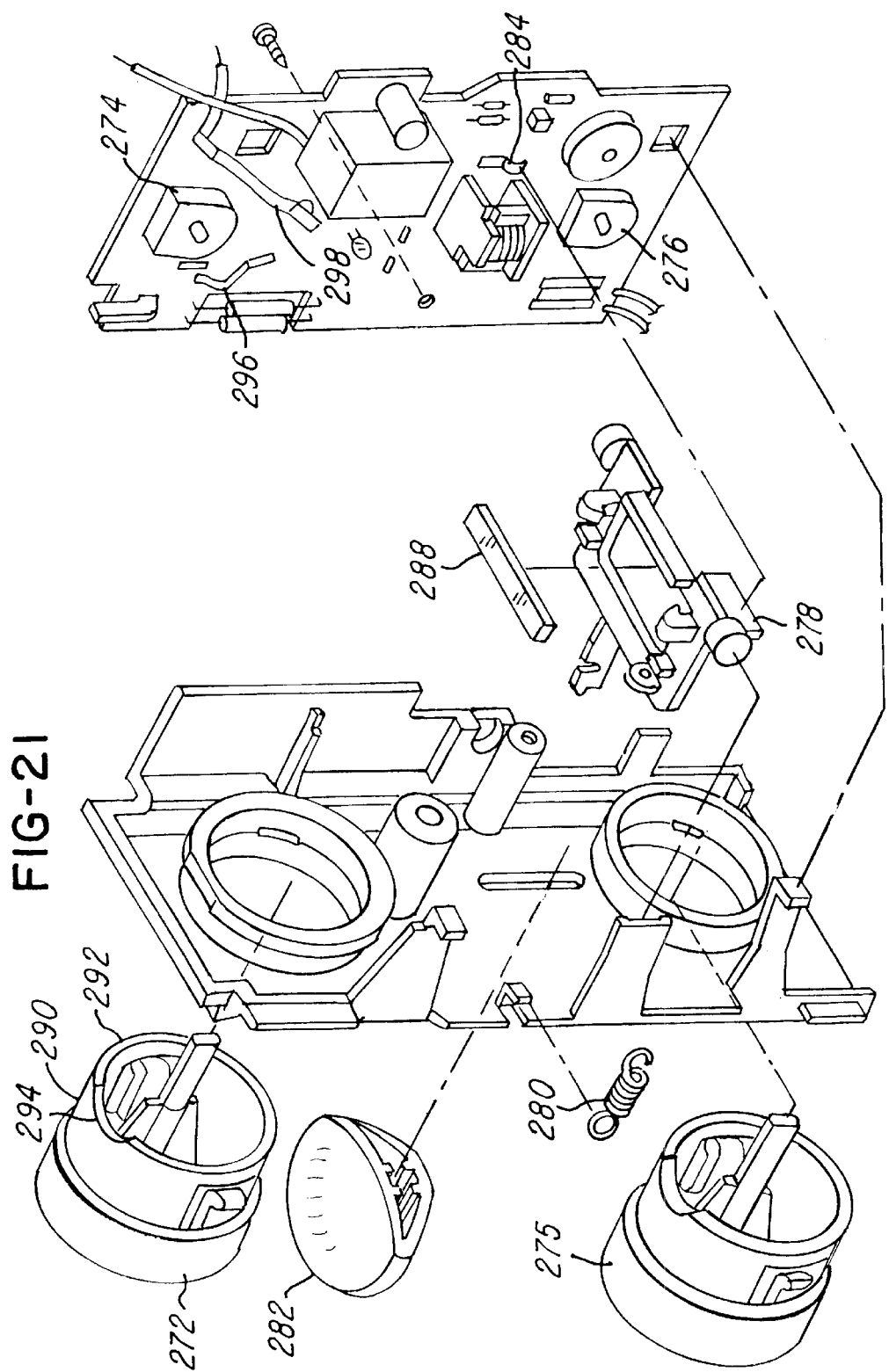

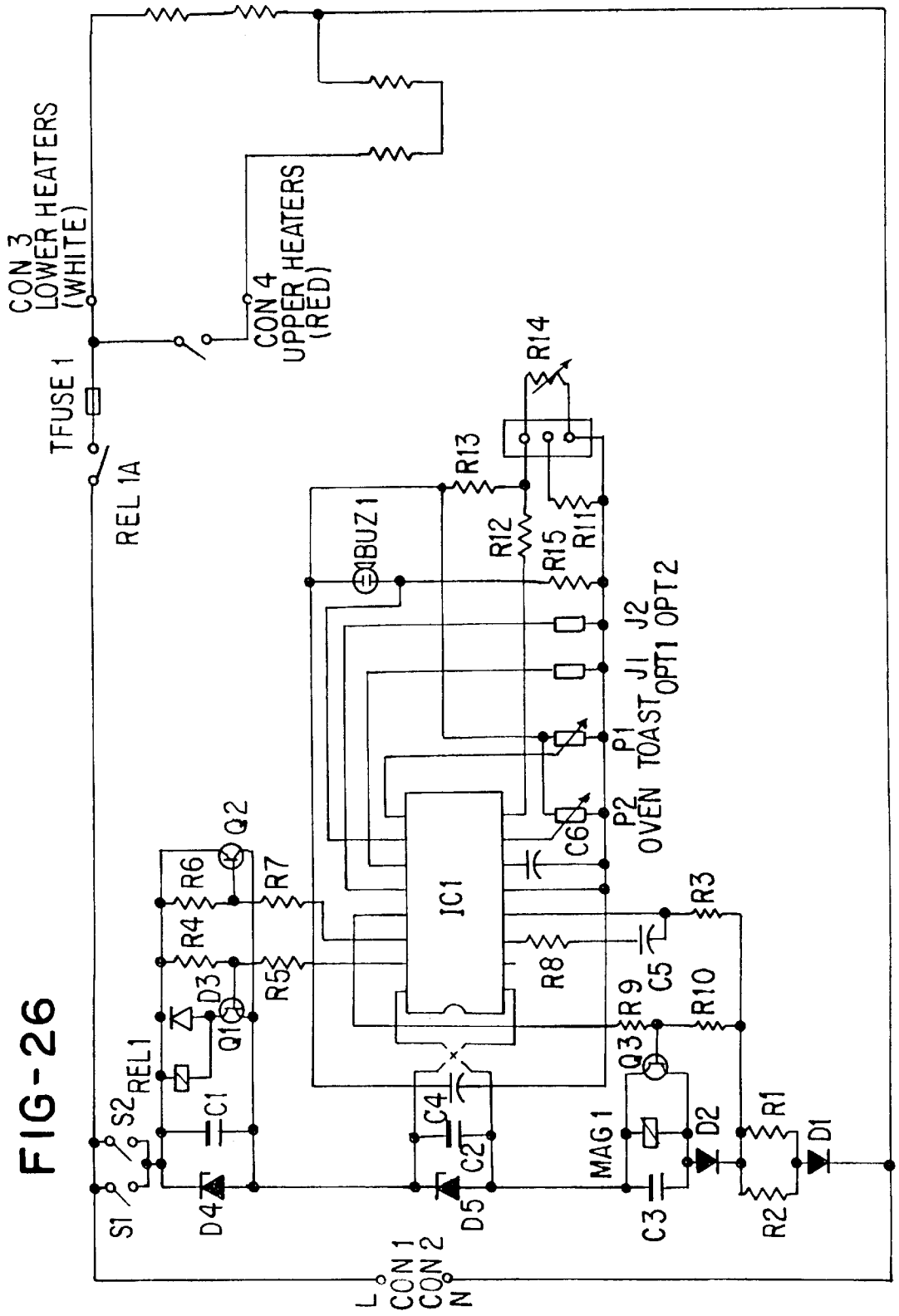

TOASTER OVENS

FIELD OF THE INVENTION

This invention relates to toaster ovens for household use but aspects of this invention may be useful in connection with other heating appliances.

BACKGROUND OF THE INVENTION

Under-the-cabinet (UTC) toaster ovens are intended to be suspended from the bottom of a kitchen cabinet but may be stored or used on a kitchen counter instead of under a cabinet. UTC toaster ovens often have features, such as channels or recesses, that are clearly visible when not mounted under kitchen cabinet and that detract from the appearance of the toaster oven used on a counter. In addition, the mounting arrangements for toaster ovens often require catches or stops which hold the toaster ovens on the cabinet mounting hardware which are not easy to install and do not enable the toaster ovens to be easily removed if needed for repair of cleaning of the toaster oven or cleaning or painting of the kitchen wall behind the cabinet-mounted toaster oven. There is an ever-present need to improve upon the design of UTC toaster ovens and upon the manner in which UTC toaster ovens can be mounted under kitchen cabinets.

Toaster ovens are made from numerous components and are, therefore, relatively expensive to manufacture and there is also a constant need to reduce the cost of manufacturing toaster ovens.

Toaster ovens are often provided with plastic side and top walls which are cool to the touch. These are known as "coolwall" toaster ovens. A problem encountered with coolwall toaster ovens is that, during storage or shipping, the top wall can become separated from the side walls if a downward force is applied to the top wall.

Toaster ovens often have a pivotally-mounted bottom panel which can be pivoted downwardly to enable the upper surface of the bottom panel to be cleaned. This is not entirely satisfactory because cleaning of the bottom panel can create a mess because crumbs or other cooking debris can fall off the bottom panel when it is pivoted open.

SUMMARY OF THE INVENTION

An object of this invention is to provide an improved UTC toaster oven and a mounting arrangement therefor which is easy to install and easy to use. A related object of this invention is to provide UTC toaster oven and a mounting arrangement which does not detract from the appearance of the toaster oven when the toaster oven is placed on a kitchen counter instead of being mounted under a cabinet.

Another object of this invention is to provide an improved coolwall toaster oven. A related object is to provide an improved arrangement for mounting a coolwall toaster oven beneath a kitchen cabinet.

Another object of this invention is to reduce the cost of manufacturing toaster ovens. A more specific object of this invention is to provide a toaster oven which can be assembled using a minimum of parts and manufacturing operations.

Another object of this invention is to provide improved controls for a toaster oven enabling it to be used in toast and oven modes and also to be used in a broil mode.

Another object of this invention is to provide an improved heat sensor for use in controlling the operation of a toaster oven.

Other objects and advantages will become apparent from the drawings and the description and claims that follow.

BRIEF DESCRIPTION OF THE DRAWINGS

FIG. 3 is a partly exploded, perspective view of the toaster oven of FIG. 1.

FIGS. 4 through 7 are enlarged, partly exploded, perspective views showing how various portions of the toaster oven of FIG. 1 are assembled.

FIG. 9 is a fragmentary perspective view of the toaster oven of FIG. 1 shown mounted under a kitchen cabinet.

FIG. 10 is a partly exploded, fragmentary, view with parts shown in cross section, of the bottom wall of a kitchen cabinet, the toaster oven of FIG. 1, a mounting bracket mounted on the bottom wall of the cabinet and used to support the toaster oven under the cabinet, and a hood or heat shield that separates the toaster oven from the bottom wall of the cabinet.

FIG. 11 is a partly exploded, perspective view showing the toaster oven of FIG. 1, the heat shield shown in FIG. 10, and two mounting brackets used to support the toaster oven under a kitchen cabinet, one of the brackets being shown in FIG. 10.

FIG. 13 is an exploded perspective view of a crumb tray and a handle therefor that form part of the toaster oven of FIG. 1.

FIG. 14 is an enlarged, fragmentary, exploded, perspective view of portions of the tray and the handle of FIG. 13 and illustrates how the handle is connected to the tray.

FIG. 15 is a partly exploded, perspective view of a second embodiment of a toaster oven in accordance with this invention.

FIG. 16 is an enlarged, partly exploded, perspective view similar to FIG. 5 but including parts of the electronic control components not shown in FIG. 5.

FIG. 17 is a fragmentary side elevational view of a portion of the dividing wall or plate between the oven chamber and the control chamber, a heat sensor mounted thereon, and the end of a heating element partly supported by the dividing plate.

FIG. 18 is an enlarged, partly schematic, exploded, fragmentary perspective view of a portion of the toaster oven and the electronic control therefor.

FIG. 19 is a view similar to FIG. 18, but showing a modified electronic control.

FIG. 20 in an enlarged, exploded, simplified perspective view of the control assembly of a toaster oven in accordance with this invention and associated electronics.

FIG. 21 is an enlarged, exploded, simplified perspective view of the control assembly of a toaster oven in accordance with this invention and associated electronics. FIG. 21 is similar to FIG. 20 but parts thereof are viewed from a different direction.

FIG. 26 is a schematic electronic circuit which may be used to control the operation of the toaster oven of this invention.

DETAILED DESCRIPTION

Figure 1:
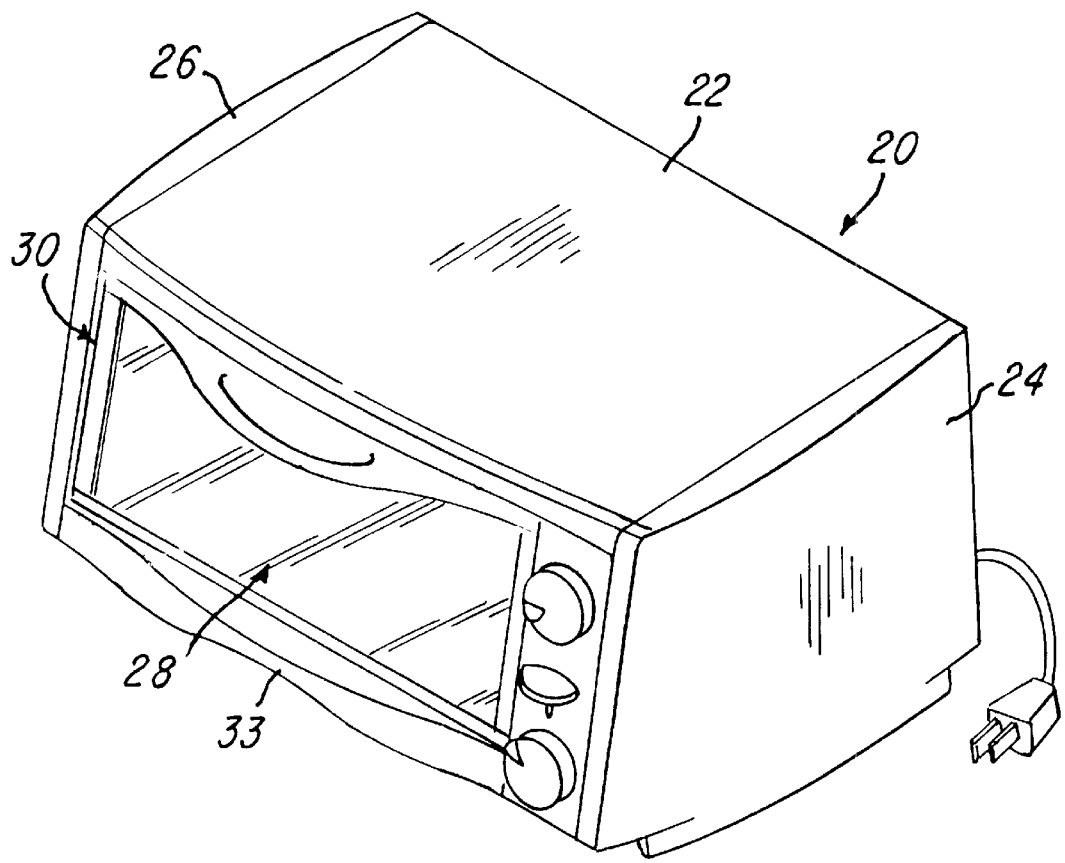
FIG. 1 is a perspective view of a toaster oven made in accordance with invention.
Figure 2:
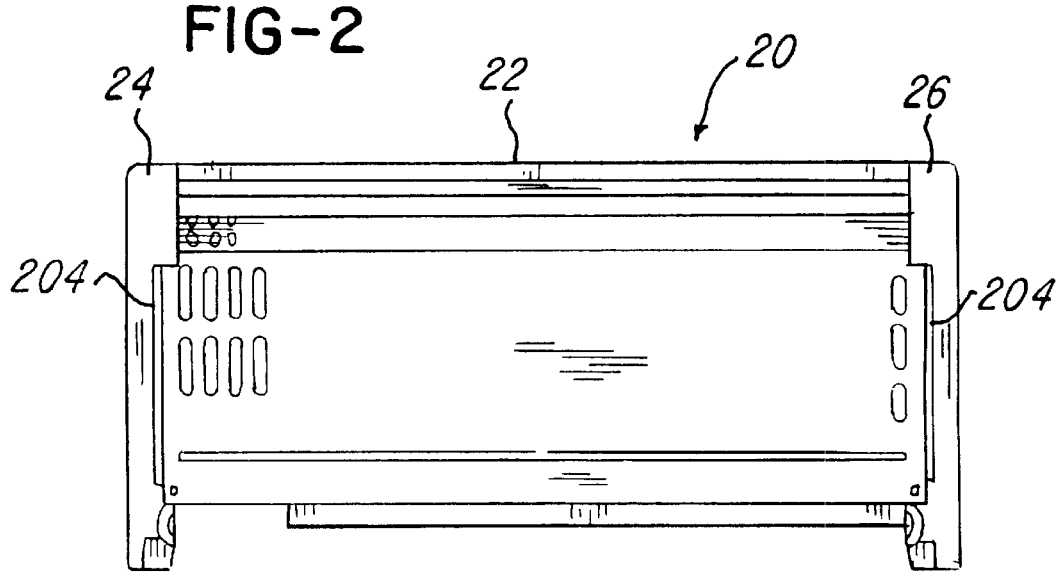
FIG. 2 is a rear elevational view of the toaster oven of FIG. 1.
Figure 6A:
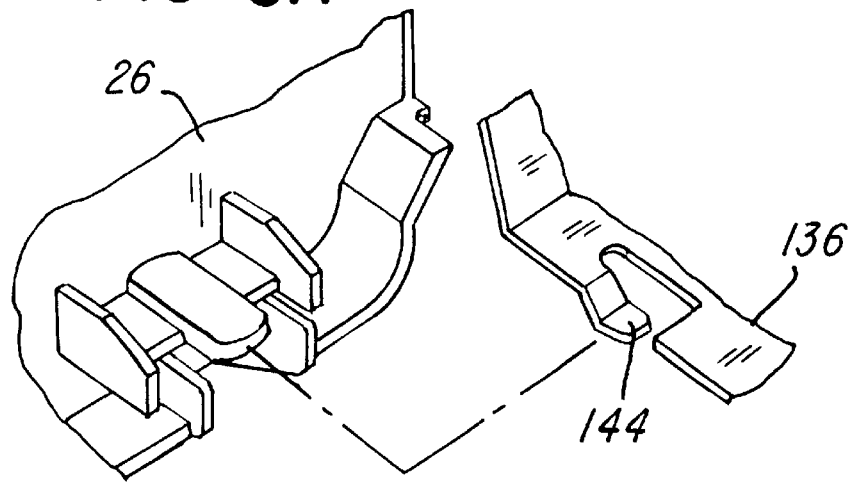
FIG. 6A is an enlarged, fragmentary, exploded perspective view of a portion of a side wall of the toaster oven and the toaster chassis.
Figure 6B:
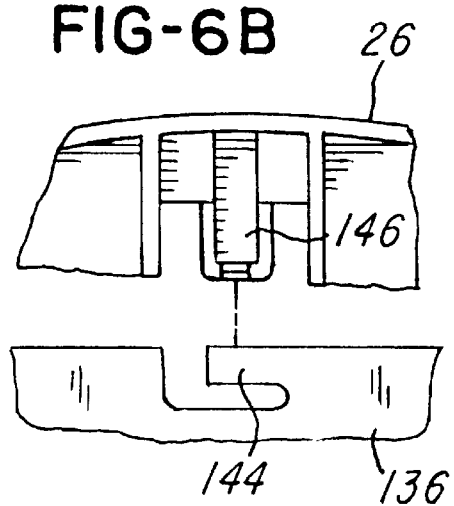
FIG. 6B is a fragmentary, exploded bottom plan view of the same portion of the toaster oven shown in FIG. 6A.
Figure 6C:
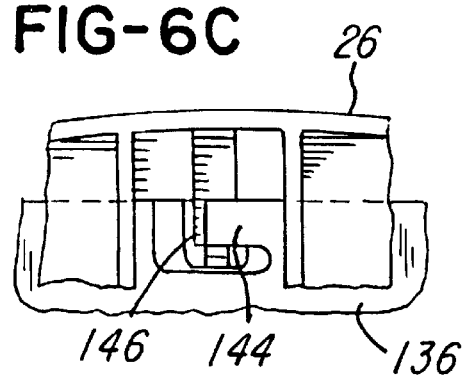
FIG. 6C is a fragmentary, bottom plan view similar to FIG. 6B showing the parts assembled together.

With reference to FIGS. 1, 2 and 3, this invention is shown embodied in an electrically-operated toaster oven, generally designated 20, which has a plastic top wall 22, a plastic right end support wall 24 (as viewed from the front), and a plastic left end support wall 26. The toaster oven 20 further includes an oven compartment or heating chamber 28 closed at the front by a pivoted, metal-framed, glass door 30 and a slide-out crumb tray 32 (FIGS. 3, 13 and 14) which has a handle 33. The plastic walls 22, 24 and 26 are, for the most part, spaced by air gaps from the metal chassis that form the oven compartment, which will be discussed below, so that the walls 22, 24 and 26 are cool to the touch.

With reference to FIGS. 3 through 6, the toaster oven 20 includes a sheet metal chassis, generally designated 40, that includes a one-piece base frame, generally designated 42, stamped out of a single piece of sheet metal, such as galvanized steel, having an elongate, horizontal, inverted U-shaped, front frame member 44 and an elongate, horizontal, V-shaped, rear frame member 46. Base frame 42 also includes a vertically-extending upstanding end plate 48 having lower corners connected to both of the horizontal frame members 44 and 46 and extending upwardly from and perpendicular to the frame members 44 and 46, and a vertically-extending, upstanding intermediate plate 50 which is parallel to the end plate 48 and also has lower corners connected to both of the frame members 44 and 46.

Chassis 40 further includes a one-piece upper frame, generally designated 52 that has a top panel 54 and a rear panel 56. The upper frame 52 is connected to the base frame 42 without the use of fasteners, welds or rivets by twist tabs 58 located on top of the upstanding base frame plates 48 and 50 which extend through cooperating slots 60 located in an upwardly-open channel 62 at the front of the upper frame 52 and also by twist tabs 64 that extend rearwardly from the rear frame member 46 through slots 66 in the lower part of the rear panel 56. A pair of alignment tabs 68 extend upwardly from the upstanding base frame plates 48 and 50 through mating slots 70 in the upper frame top panel 54 assist the twist tabs 64 to secure the upper frame 52 in a stable manner to the base frame 42.

Two pairs of sheathed heating elements, namely an upper pair of heating elements 72 and a lower pair of heating elements 74 span between the upstanding frame plates 48 and 50 and have insulating end caps 76 supported by the plates 48 and 50. A pair of reflectors 78 are connected by twist tabs 79 to the upstanding frame plates 48 and 50 and overlie the upper heating elements 72 in order to promote even heating inside the oven chamber 28.

A sheet metal bottom cover 80 is pivotally connected to the rear frame member 46 by means of stub axles 82 on the base frame 42 adjacent its rearward edge and upstanding bearing ears 84 formed on bottom cover 80. The front portion of the bottom cover 80 is releasably connected to the base frame 42 by a pair of spring clips 82 struck upwardly from the bottom cover 80 and removably received within cooperating slots 84 in the base frame 42. As evident, the bottom cover 80 normally substantially closes the open area of the base frame 42 between the front and rear frame members 44 and 46. The rearward portion of the bottom cover 80 slopes upwardly and rearwardly to form a narrow panel 86 that substantially closes a gap 88 between the base frame 42 and the upper frame 52 when the bottom cover 80 is connected in its normal position closing the open area of the base frame 42.

The base frame 42, the upper frame 52, and the bottom cover 80 form the top, bottom, sides and rear of an oven heating chamber 28. The oven door 30 comprises a pane of glass 94 held by U-shaped side frames 96 and including a door handle 98 along the top of the glass pane 94 is provided to form the front wall of the heating chamber 28. The door 30 is pivotally mounted on the front frame member 44 which, for this purpose, has an upstanding bearing ring 100 adjacent one end of the heating chamber 28 and a U-shaped bearing 102 adjacent the other end of the heating chamber 28. The door side frames 96 have stub axles 104 rotatably mounted on the bearing surfaces of the bearing members 100 and 102 that enable the door 30 to be pivoted to 11 opened and closed positions. In normal usage, the door 30 is biased into its closed position by a door return spring 106 extended between the base frame 42 and a stop lever 108 outside the oven chamber 28 and integral with the adjacent door side frame 96 nearest the upstanding frame end plate 48. As apparent from the drawing, the stop lever 108 limits the angle through which the oven door 30 can be opened.

A wire grill 110 is slidably mounted in mutually-confronting, horizontal grooves 112 formed in the upstanding frame plates 48 and 50. Bifurcated grill-engaging cams 114 on the oven door side frames 96 each have a first cam surface that engages the grill 110 when the door 30 is pivoted open and thereby pull the grill 110 partly out of the oven chamber 28 and a second cam surface that engages and pushes the grill 110 fully into the oven chamber 28 as the oven door 30 closes.

FIG. 5 shows an optional chamber rear plate 116 that has a non-stick surface, such as Teflon, coated on its front face and that is connected to the rear frame panel 56 by twist tabs 118. If the non-stick coated rear plate 116 is provided, the mutually confronting inner faces of the upstanding base frame plates 48 and 50 preferably also have a non-stick coating.

Toaster oven 20 includes a control chamber, generally designated 120, which is separated from the oven chamber 28 by the intermediate frame plate 50. Control chamber 120 has a bottom wall 122 that is part of the base frame 42 and a rear wall 124 that is an extension of the rear frame panel 56. A control panel 126 is supported by the horizontal front frame member 44. A printed circuit board 128 is mounted on the control panel 126 along with electronic circuit components and switches for controlling the energization of the heating elements 72, as will be further discussed below. To avoid excessive heat in the control chamber 120, the sheet metal parts forming the control chamber 120 are provided with cooling vents 130. Because there may be an opportunity for moist, heated air escaping from the heating chamber 28, a baffle 132 (FIG. 5) may be provided to block the flow of air from the heating chamber 28 into the vents 130 located in the forward part of the upper frame member 52.

With reference to FIGS. 6, 6A, 6B, 6C and 8, the inside surfaces of the plastic support walls 24 and 26 include plural support surfaces 134 that engage underneath the end margins, designated 136 and 138, of the base frame 42 to provide support for entire chassis 40. In addition, each of the support walls 24 and 26 is connected to the upper frame 52 by a pair of slotted tabs 140 on the support walls 24 and 26 that receive a pair of upwardly-extending alignment fingers 142 struck out of the upper frame 52. The support walls 24 and 26 are rigidly connected to the chassis 40 by the cooperation between the slotted tabs 140 with the alignment fingers 142 and by a pair of locking tabs or fingers 144 located at each end margin 136 and 138 of the base frame 42 which are bent upwardly to enter into a pair of downwardly opening recesses 146 (FIGS. 6A, 6B and 6C) formed in the support walls 24 and 26.

Figure 8:
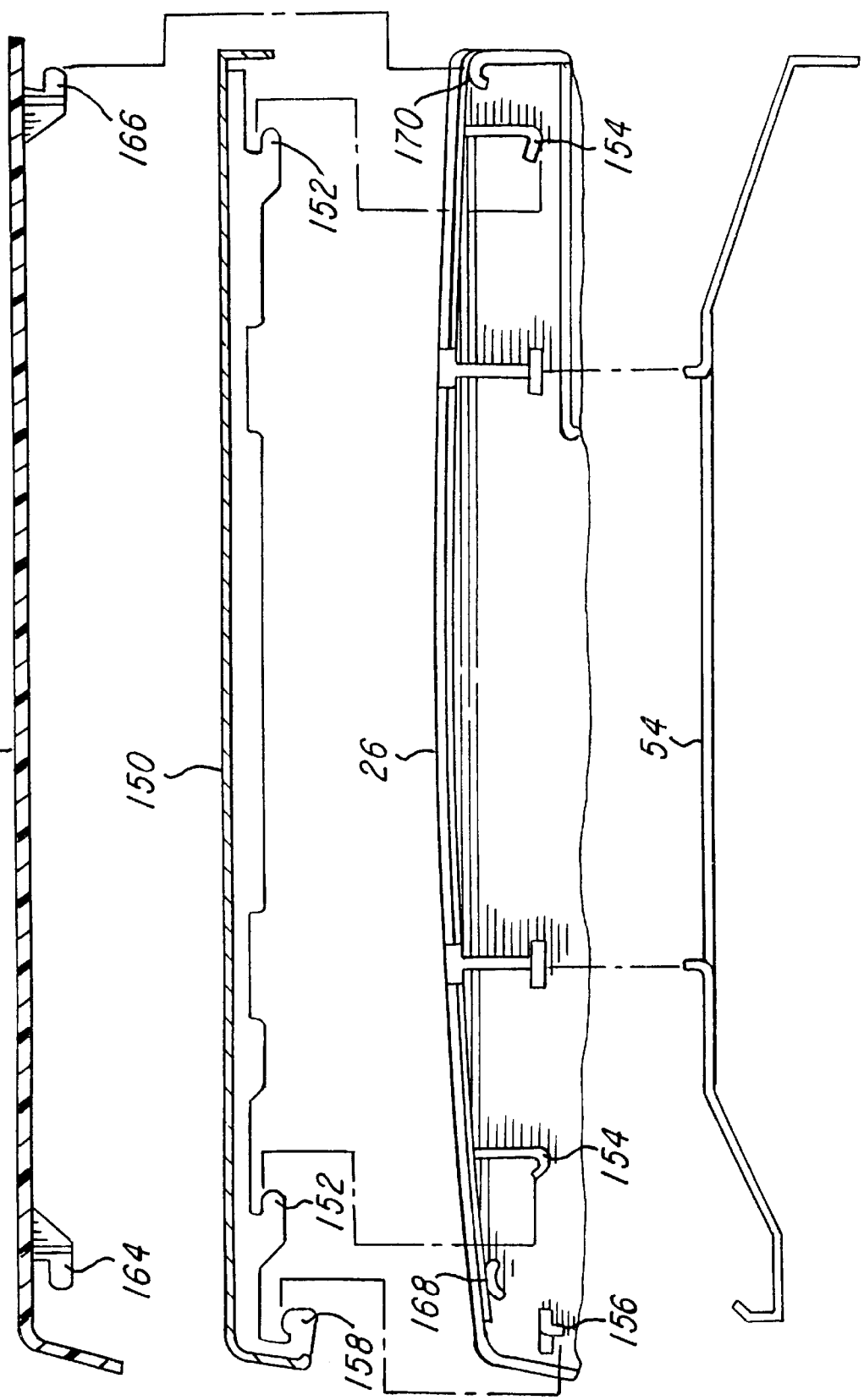
FIG. 8 is a fragmentary, exploded side elevational view showing how portions of the toaster oven of FIG. 1 are assembled.
Figure 12:
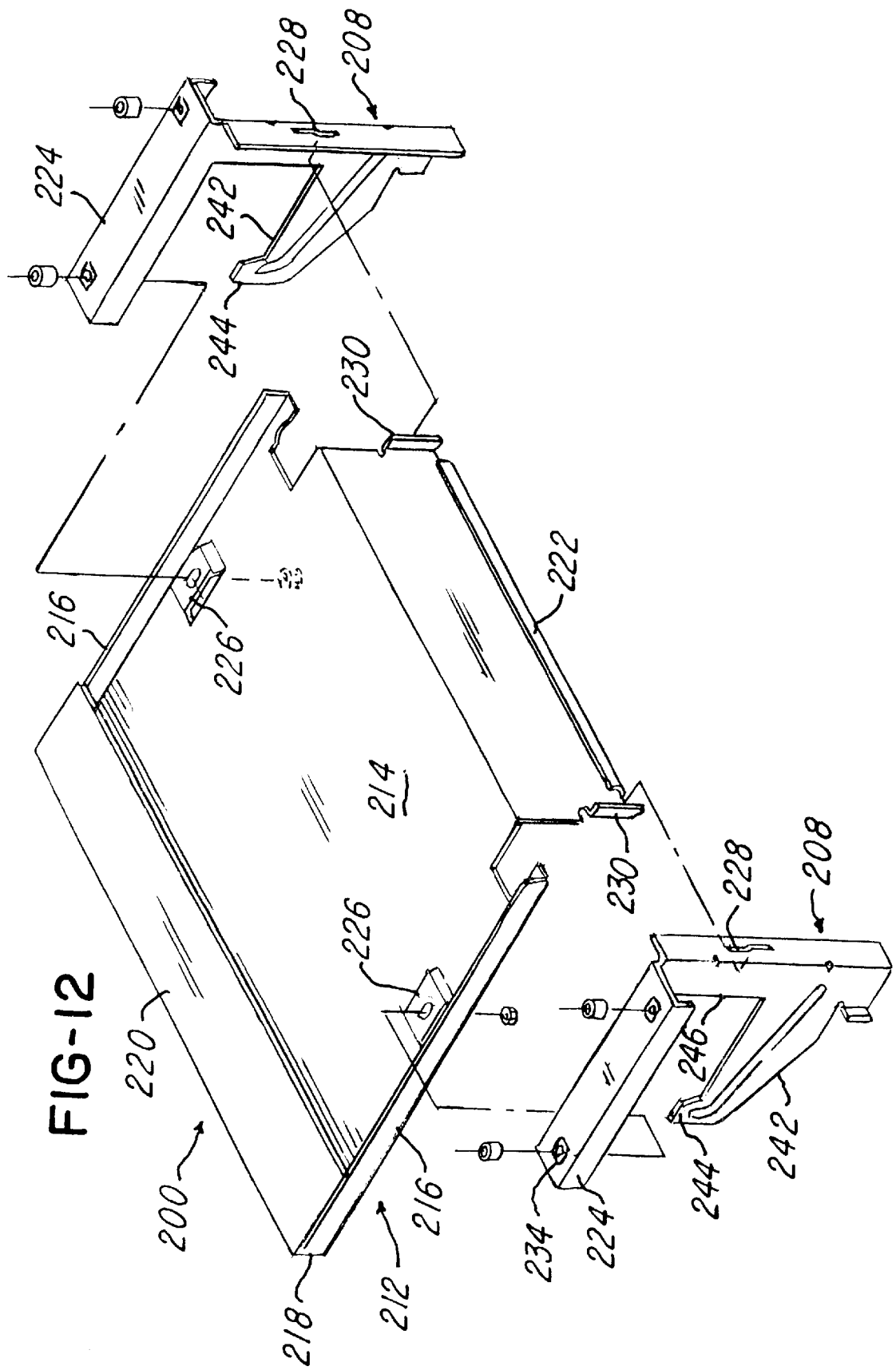
FIG. 12 is an exploded, perspective view of the mounting brackets and the hood or heat shield and also including spacers and nuts used in connecting the brackets to the bottom wall of a kitchen cabinet.
Figure 22:
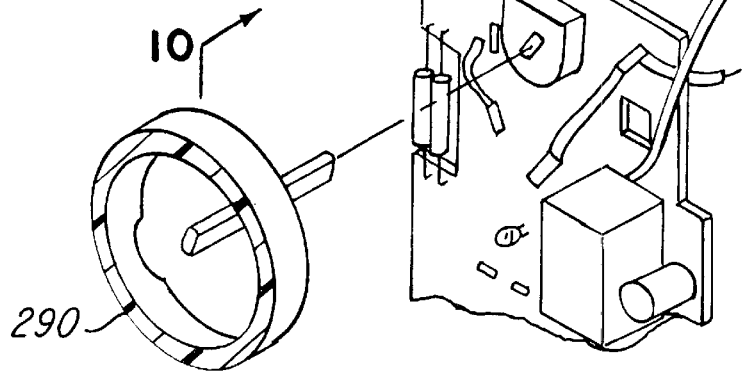
FIG. 22 is an enlarged, fragmentary, exploded, simplified perspective view of a portion of the control assembly of FIGS. 20 and 21.
Figure 23:
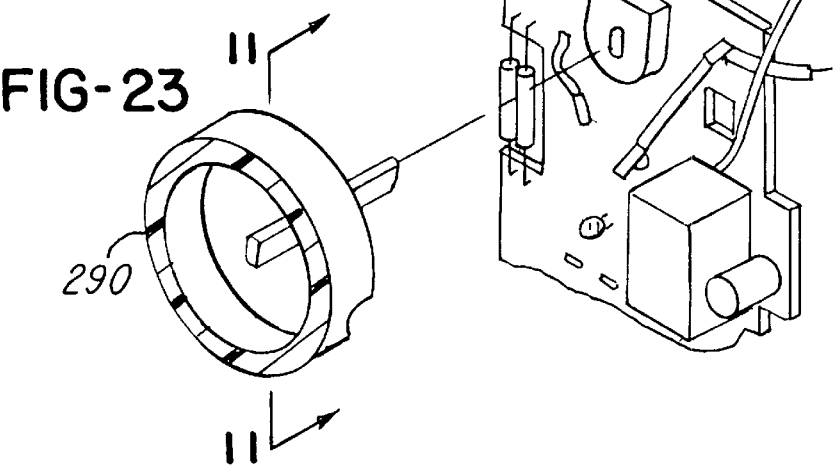
FIG. 23 is similar to FIG. 22 but shows a different operating condition of the control assembly.
Figure 24:
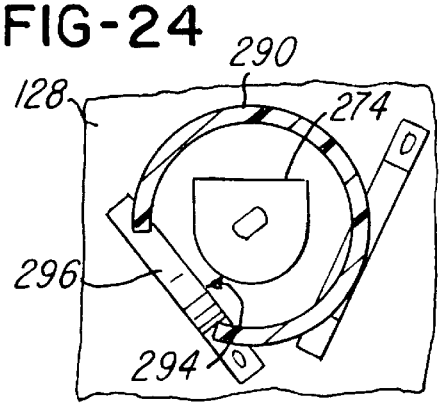
FIG. 24 is a fragmentary, simplified, cross-sectional view of parts of the control assembly in the operating condition shown in FIG. 22.
Figure 25:
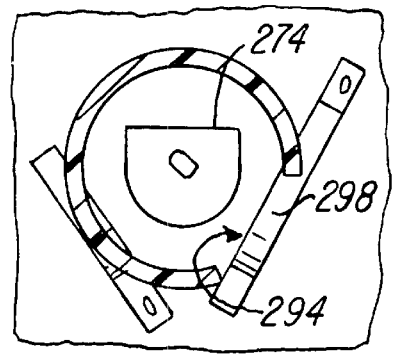
FIG. 25 is a view similar to FIG. 24 but showing parts of the control assembly in the operating condition shown in FIG. 23.

With reference to FIGS. 6, 7 and 8, a one-piece sheet metal barrier wall 150 is supported by the plastic support walls 24 and 26 on top of the upper frame 52. Each end of the barrier wall 150 is provided with a pair of rearwardly opening hooks 152 adapted to engage under support ledges 154 projecting inwardly from the inside faces of the plastic support walls 24 and 26. After the support walls 24 and 26 are mounted in supporting relation to the chassis 40, as described above, the ends of the barrier wall 150 are positioned over the support ledges 154, with the hooks 152 located slightly forward of the support ledges 154, as illustrated in FIG. 8, and the barrier wall 150 lowered into engagement with the support ledges 154. The barrier wall 150 is then pushed rearwardly, i.e. to the right as viewed in FIG. 8, which causes the hooks 152 to trap the ledges 154. Upon completion of the rearward movement of the barrier plate 150 to the right, locking bosses 156 at the forward ends of the support walls 24 and 26 snap into locking engagement with locking hooks 158 at the forward end margins of the barrier plate 150. As a result, the barrier wall 150, the support walls 24 and 26 and the chassis 40 are securely held together as an integral unit. The control chamber 120 is accordingly closed by the right side plastic support wall 24.

With reference to FIGS. 6, 7 and 8, the final step in assembling the toaster oven 20 is the mounting of the top cover 20 on the plastic support walls 24 and 26. For this purpose, the right side of the top cover 22 has a flange 160 that slides into pockets (not shown) provided therefor immediately below a narrow upper wall portion 162 of the right side support wall 26 at the uppermost inside surface of the right side support wall 24. Thereafter, a forwardly-facing front hook 164, shown best in FIG. 8, and a rearwardly-facing rear hook 166 depending from the bottom surface of the top cover 22 are snapped into locking engagement with locking posts 168 and 170, respectively, by a downward pressure applied to the upper surface of the top cover 22.

With reference to FIGS. 13 and 14, the crumb tray 32 is made from a single piece of sheet metal and the handle 33 is made from plastic. The tray 32 has a first pair of upwardly-facing hooks 172 struck out of a vertical front wall 174 thereof and a second pair of downwardly-extending hooks 176. To assemble the tray 32 and the handle 33, the upwardly-facing hooks 172 are inserted into a pair of slots 178 in the vertical rear face, designated 180, of the handle 33. The handle 33 is then pivoted about its longitudinal axis A so that the downwardly-extending hooks 176 are received within another pair of slots 182 in a horizontal wall 184 that underlies the tray 32. The free ends of the latter hooks 176 are then bent around posts (not shown) formed on the handle 33 to affix the tray 32 and the handle 33 together. The completely assembled crumb tray and handle may be installed either before or after the assembly of the toaster oven is completed.

The plastic support walls 24 and 26 and the top cover 22 and the control panel 126 can be molded from suitable plastic materials, polyester bulk molding compound being an example. The control knobs may be made from a polycarbonate or other suitable plastic material.

With reference to FIG. 15, a second embodiment of a toaster oven, generally designated 20', is illustrated which is the same as the embodiment of FIGS. 1 through 8 except that the plastic support walls, designated 24' and 26', of FIG. 15 are shorter and do not provide for the mounting of the plastic top cover 22 of FIGS. 1 through 8. Accordingly, the barrier wall 150 is the top wall of the toaster oven 20'. In addition, the crumb tray 32 of the first embodiment is not assembled into the toaster oven 20' of FIG. 15. Instead, the slot in which the crumb tray could otherwise be inserted is covered by a horizontal trim piece 186 which may be assembled onto the left side support wall 26 and the control panel 26. It will be noted that the chassis of FIG. 15 is preferably identical to the chassis 40 of the first embodiment.

In both embodiments of the toaster oven, a vertical trim piece 188 is mounted on the inside surface of the left side support wall 26 to hide such inside surface which otherwise would be visible when the oven door 30 is opened.

FIGS. 9 through 12 illustrate a mounting assembly, generally designated 200, by which the toaster oven 20 may be supported under a kitchen cabinet 202. Here it may be noted that the toaster oven 20' of FIG. 15 could be mounted under a kitchen cabinet using the same mounting assembly 200.

Before proceeding with a discussion of the mounting assembly of FIGS. 9 through 12, it will be noted from an inspection of FIGS. 2 and 11 that the plastic support walls 24 and 26 are constructed to provide a pair of vertical slots 204, one adjacent each support wall, which are open to support pads 206 shown in FIGS. 3, 6 and 10 and formed on the inside surface of both support walls 24 and 26. The slots 204 and the support pads 206 are provided to enable a pair of mounting brackets 208 to support the support pads 206, and thereby the toaster oven 20 from the bottom wall of a kitchen cabinet, such as the bottom wall, designated 210, of the kitchen cabinet 202.

Before connection of the mounting brackets 208 to the cabinet bottom wall 210, the brackets 208 are partly assembled together with a sheet metal heat shield or hood 212. As shown best in FIG. 12, the hood 212 comprises a horizontal base plate 214 that has upwardly-extending side walls 216, a front wall 218, a narrow upper-wall plate 220 at the front end of the hood 212, and a depending vertical rear plate 222. Use of the hood 212 provides an insulating air space between the toaster oven 20 and the kitchen cabinet 202 and a shield for the kitchen wall (not shown) located behind the hood 212. The front end of the hood 212 is designed to project forwardly of the cabinet 202 so that heat rising from the toaster oven 20 will not directly impinge on the front of the cabinet.

To assemble the brackets 208 and the hood 212 together, a downwardly-facing channel 224 on each bracket 208 is aligned with a rectangular boss 226 struck upwardly from the hood base plate 214 and an "S" slot 228 in the rear vertical wall 230 of each bracket 208 is aligned with an alignment tab 230 extended rearwardly from the hood rear plate 222. The "S" slots 228 each have overlapping vertical slot portions which are mutually offset from one another to obtain a secure engagement with the alignment tabs 230.

The brackets 208 and the hood 212 as thus assembled are mounted on the bottom cabinet wall 210 and securely connected to one another and to the cabinet wall 210 by a pair of mounting bolts 232 that are threadedly engaged with nuts 234 trapped in the bracket channel 224 and by cap nuts 236 beneath the hood base plate 214. In addition, the brackets 208 are connected to the cabinet wall 210 by another pair of mounting bolts 238. Both pairs of mounting bolts 232 and 238 extend downwardly through bolt holes in the cabinet bottom wall 210. Their upper ends are preferably covered by elastomeric caps 240. To accommodate different cabinet constructions, spacers 241 surrounding the bolts 232 and 238 are provided to enable adjustment of the separation between the bottom wall 210 and the top of the brackets 208 while ensuring a sturdy connection of the mounting brackets 208 to the cabinet.

As evident from an inspection of FIG. 10, after the brackets 208 are installed in the manner just described, the toaster oven 20 can be moved toward the brackets 208 from in front of the cabinet 202 with their vertical slots 204 aligned with forwardly-extending bracket support arms, designated 242, forming part of the brackets 208. The support arms 242 have are hook-like, having upwardly extending abutments 244 at their forwardmost, free ends. During the mounting process, the toaster oven 20 must be held sufficiently high to clear the abutments 244. When the toaster oven 20 strikes vertical arms 246 at the rear of the brackets 208, the toaster oven may then be lowered whereupon the support pads 206, and thereby the toaster oven, will be supported by the bracket support arms 242. It will noted that the abutments 244 have sloping rearward surfaces that are at essentially the same angle as the forward ends of the support pads 206. Accordingly, the toaster oven 20, once lowered onto the brackets 208 cannot be moved either forwardly or rearwardly, or from side to side, unless it is lifted off the brackets 208. Removal of the toaster oven 20 is a simple matter. It simply is lifted until it cannot be lifted any higher and then withdrawn away from the brackets 208.

Turning now to the electronic control of toaster ovens of this invention, FIGS. 16 and 18 show a control assembly, generally designated 250, that includes the aforementioned control panel 126 and the printed circuit board 128 mounted thereon. In addition, FIG. 16 shows two busses 252 and 254 in the control chamber 120. Buss 252 is connected to both the forwardmost upper heating element 72 and the forwardmost lower heating element 74, while buss 254 connects the rearward elements 72 and 74 together. At the opposite end of the chassis 40, an upper buss 256 connects the opposite ends of the upper heating elements 72 together and a lower buss 258 connects the lower heating elements 74 together. This control operates such that all of the heating elements operate at the same time.

FIG. 16 also shows, along with FIG. 17, a temperature sensor 260 used to control the electronic circuit of this invention. The sensor 260 includes a thermistor (not shown) housed within a porcelain tube 262 that is held by a clip 264 to the intermediate frame plate 50 that divides the control chamber 120 from the oven chamber 28. Circuit wires 266 leading from the control assembly 250 to the thermistor are knotted underneath the porcelain tube 262 so the that the thermistor is securely retained in the porcelain tube 262. The tube 262 is held against the face of the intermediate frame plate 50 located in the control chamber 120 quite close to the end of one of the upper heating elements 72, this being a location which is heated to a greater extent than other areas of the plate 50, and which provides a sensitive, accurate indication of the heated condition inside the oven chamber 28. The heat sensor 260 is highly satisfactory and may be used with many electronic control circuits.

FIG. 19 shows a different electrical connection from the control assembly 250 to the heating elements 72 and 74. In this case, there is no buss between the forwardmost upper heating element 72 and the forwardmost lower heating element 74. Rather, two separate circuit wires are connected to these two heating elements. This enables a control operation in which the lower heating elements 74 can be deenergized when the upper heating elements 72 are energized. This is a condition suited for broiling.

FIGS. 20 and 21 show the control panel 126 separated from the printed circuit board 128. The control panel 126 includes an upper, oven temperature control knob 272 that controls a first potentiometer 274 and a lower, toast color control knob 275 that controls a second potentiometer 276. In addition, the control panel 126 includes a pivoted toast operation control lever 278 which is so biased by a spring 280 that its outer end, to which a knob 282 is connected, is biased upwardly. To initiate a toasting cycle, the oven temperature control knob 272 is turned to its "off" position so that the toast color will be determined solely by the adjustment of the toast color control knob 274. The toast operation control knob 282 is then pushed downwardly against the bias of the spring 280, which moves the lever 278, causing it to close a switch 284 (represented in the drawings by its spring contact) on the printed circuit board 128. Closure of the switch 284 energizes an electromagnet 286 which holds an armature 288 mounted on the pivoted toast operation control lever 278 against the bias of the spring 280. Closure of the switch 284 also initiates a toasting operation which continues until discontinued by operation of the electronic circuitry. At the end of a toasting cycle, the electromagnet 286 is deenergized and the control lever 278 returned to its inactive position by the spring 280.

With reference also to FIGS. 22 through 25, the upper, oven temperature control knob 272 has a cylindrical outer wall 290 with a cylindrical end portion 292 facing the printed circuit board 128. The cylindrical end portion 292 is uniformly spaced from the printed circuit board 128 except for a recess 294. In operation, the end portion 292 opens a first switch 296 (represented in the drawings by its spring contact blade) when the oven temperature control knob 272 is in its "off" position because the recess 294 is aligned with the first switch 296. At any other rotary position of the control knob 272, the first switch 296 is held closed by the knob end portion 292, as would be necessary to the operation of the toaster oven. However, a second switch 298 (also represented by its spring contact blade) is held closed at all times by the knob end portion 292, except when the knob 272 is rotated through a substantial angle to align the recess 294 with the second switch 298. This is the position of the control know 272 illustrated in FIGS. 23 and 24. Opening of the second switch 298 removes electrical power from the lower heating elements 74 when the toaster oven is to be used in a broil mode.

FIG. 26 is a schematic diagram of an electric circuit that could be used to control the operation of the toaster ovens of this invention. ICI is a ROM programmed to control the several modes of operation of the invention.

I claim:

1. A toaster oven comprising:
   a chassis comprising:
      a one-piece base frame including an elongate, horizontal front frame member, an elongate, horizontal rear frame member, a vertically-extending end panel having lower corners connected to both of said frame members and extending upwardly from and perpendicular to said frame members, and a vertically-extending intermediate panel parallel to said end panel and having lower corners connected to both of said frame members and extending upwardly from said frame members, and
      a one-piece upper frame connected to said base frame and having a top panel and a rear panel;
   a bottom panel pivotally mounted on said rear frame member and releasably connected to said front frame member;
   a front door pivotally connected to said front frame member, said base frame, said top frame, said bottom panel and said door forming an enclosed oven chamber; and
   plural heating elements supported by said end panel and said intermediate panel and extending through said oven chamber.

2. The toaster oven of claim 1 wherein said upper frame is connected to said base frame without the use of fasteners or welds by twist tabs that extend from said base frame through said upper frame.

3. The toaster oven of claim 1 wherein said bottom panel is connected to said base frame without the use of fasteners or welds by twist tabs that extend from said base frame through said upper frame.

4. The toaster oven of claim 1 further comprising a pair of plastic end panels having chassis-supporting surfaces that support said chassis, and a sheet metal top panel extending over the top of said chassis and connected to and spanning between said plastic end panels.

5. The toaster oven of claim 4 wherein said chassis and said plastic side panels having interfitting tabs and recesses which prevent separation of the lower ends of said plastic side panels from said chassis.

6. The toaster oven of claim 4 wherein said sheet metal top panel is connected to one of said plastic end panels by interfitting parts that are snap fit together.

7. The toaster oven of claim 6 further comprising a crumb tray slidably mounted between said base frame and said bottom panel.

8. A toaster oven having an oven chamber having a pair of end panels, a top panel and a rear panel formed by a sheet metal frame assembly, a sheet metal bottom panel mounted on said frame assembly, and a door mounted on said frame assembly, said toaster oven further having a control chamber separated from said oven chamber by one of said end panels, a top panel, a rear panel and a bottom panel formed by said frame assembly, and a control panel closing the front of said control chamber, said toaster oven additionally having a pair of plastic support walls that support said frame assembly therebetween, each of said plastic support walls having support pads that support said frame assembly and said plastic support walls and said frame assembly having interfitting tabs and recesses that prevent separation of said plastic support walls from said frame assembly, a sheet metal top wall spanning between and connected to the upper ends of both of said plastic support walls, and a plastic top panel generally parallel to and spaced above said sheet metal top wall, said plastic top panel being connected to and spanning between both of said plastic support walls.

9. The toaster oven of claim 8 wherein said sheet metal top wall and said plastic support walls have interfitting parts that are snap fit together.

10. The toaster oven of claim 8 wherein one of said plastic support walls has a pair of locking pins, and wherein said plastic top wall has a forwardly-facing hook engaged with one of said locking pine and rearwardly-facing hook engaged with the other of said locking pins.

11. The toaster oven of claim 8 wherein said oven chamber further comprises a sheet metal rear panel mounted on said frame assembly, and wherein the surfaces of said rear panel and said end panels of said oven chamber are covered by a non-stick coating.

12. The toaster oven of claim 8 wherein said plastic support walls have mutually-confronting inner faces, toaster oven-support pads mounted on said inner faces in mutually confronting relationship, a rear portion of each of said plastic support walls being laterally spaced from the sides of said frame assembly to provide a slot to enable a mounting member to engage under said toaster oven-support pads.

13. A toaster oven having an oven chamber formed by a sheet metal frame assembly, a sheet metal bottom panel pivotally mounted on said frame assembly to permit access to said oven chamber from beneath the toaster oven, and a crumb tray slidably mounted on said bottom panel.

14. A toaster oven and an under-the-cabinet mounting assembly comprising:
   a toaster oven having an oven chamber and a control chamber defined in part by a sheet metal frame assembly, a pair of mutually-parallel plastic support walls connected to said frame assembly and supporting said frame assembly therebetween, said plastic support walls having mutually-confronting inner faces, toaster oven-support pads projecting from said inner faces in mutually confronting relationship, a rear portion of each of said plastic support walls being laterally spaced from the ends of said frame assembly to provide a pair of slots, one between each end of said frame assembly and the adjacent one of said plastic support walls, said slots being open to said toaster oven-support pads; and
   an under-the-cabinet mounting assembly comprising a first mounting member having a support arm adapted to be extended through one of said slots and under one of said support pads in supporting relationship thereto, and a second mounting member having a support arm adapted to be extended through the other of said slots and under the other of said support pads in supporting relationship thereto.

15. The toaster oven and under-the-cabinet mounting assembly of claim 14 wherein said support pads have forwardly-facing front faces and said mounting members each have an upwardly-extending, rearwardly-facing surface for engaging said front faces and preventing said toaster oven from being moved forwardly relative to said mounting members when said toaster oven is supported by said mounting members.

* * * * *